United States Patent [19]

Igarashi

[11] 4,255,491

[45] Mar. 10, 1981

[54] HEAT-SENSITIVE RECORDING PAPER

[75] Inventor: Akira Igarashi, Fujinomiya, Japan

[73] Assignee: Fuji Photo Film Co., Ltd., Minami-ashigara, Japan

[21] Appl. No.: 58,401

[22] Filed: Jul. 17, 1979

[30] Foreign Application Priority Data

Jul. 18, 1978 [JP] Japan .................................. 53/87598

[51] Int. Cl.[3] ........................ B32B 21/04; B32B 21/06

[52] U.S. Cl. .................................. 428/537; 282/27.5; 427/144; 428/913

[58] Field of Search ............... 427/144, 145, 146, 148, 427/151, 411, 326; 428/537, 913; 282/27.5; 96/114.1

[56] References Cited

U.S. PATENT DOCUMENTS

| | | | |
|---|---|---|---|
| Re. 29,272 | 6/1977 | Hintz et al. | 427/411 |
| 2,240,031 | 4/1941 | Bour | 427/326 |
| 3,276,359 | 10/1966 | Worthen et al. | 427/411 |
| 3,445,261 | 5/1969 | Talvalkar | 427/151 |
| 3,539,375 | 11/1970 | Baum | 428/537 |
| 3,674,535 | 7/1972 | Blose et al. | 428/539 |
| 3,792,481 | 2/1974 | Nagashima et al. | 427/144 |
| 3,816,122 | 6/1974 | Hamb | 96/114.1 |
| 3,895,173 | 7/1975 | Adachi | 428/913 |
| 3,937,864 | 2/1976 | Kohmura et al. | 427/151 |
| 3,950,600 | 4/1976 | Knirsch et al. | 427/151 |
| 3,959,571 | 5/1976 | Yahagi et al. | 427/151 |
| 4,012,554 | 3/1977 | Miller et al. | 427/151 |
| 4,144,072 | 3/1979 | Ikenoue et al. | 96/114.1 |
| 4,151,748 | 5/1979 | Baum | 427/146 |

FOREIGN PATENT DOCUMENTS

| | | | |
|---|---|---|---|
| 1197103 | 7/1965 | Fed. Rep. of Germany | 427/411 |

*Primary Examiner*—Morris Kaplan
*Assistant Examiner*—Sadie L. Childs
*Attorney, Agent, or Firm*—Sughrue, Rothwell, Mion, Zinn and Macpeak

[57] ABSTRACT

A heat-sensitive recording paper comprising a base paper having a hot water extraction pH of about 6 to 9 having provided thereon a heat-sensitive recording layer containing an electron donating colorless dye and an electron accepting acidic material.

8 Claims, No Drawings

HEAT-SENSITIVE RECORDING PAPER

BACKGROUND OF THE INVENTION

1. Field of the Invention

The present invention relates to a heat-sensitive recording paper and, more particularly, to a heat-sensitive recording paper capable of forming a dye image having improved preservability under high temperature and high humidity conditions.

2. Description of the Prior Art

In heat-sensitive recording papers images are formed utilizing physical or chemical changes in the materials induced by heat energy, and a large number of processes using heat-sensitive recording papers have been investigated.

One type of heat-sensitive recording paper which relies upon a heat induced physical change is a so-called wax type heat-sensitive recording paper is well known and has been used for recording electrocardiograms and the like. On the other hand, as a material utilizing a chemical change due to heat to form images, a number of materials based on various different color-forming mechanisms have been proposed. Of these, a binary coloration system is most typical.

A binary coloration system is prepared by dispersing two heat-reactive compounds as fine particles in a binder or the like such that the binder separates them from each other, and coating the resultant mixture on a base paper. The thus prepared paper records images by heating it to melt one or both of the compounds such that they came into contact with each other, thus causing a color-forming reaction. These two heat-reactive compounds are generally referred to as electron donating compounds and electron accepting compounds, respectively. An extremely large number of combinations of them are known, and they are roughly classified as systems forming images of a metal compound and systems forming dye images.

Representative examples of systems forming images of a metal compound are those in which the electron donating compounds are organic reducing agents such as phenols, chelating agents, sulfur compounds, or amino compounds, and the electron accepting compounds are organic metal salts. These two produce a metal, metal complex compound, metal sulfide, or the like through the reaction therebetween upon being heated, thus providing a colored image. Specifically, there are a combination of thiourea and heavy metal salt (U.S. Pat. No. 2,740,895), a combination of gallic acid or the like and metal salt of stearic acid (U.S. Pat. Nos. 2,663,654, 2,663,655, 2,663,656, and 2,663,657), a combination of hydroquinone and silver behenate (U.S. Pat. No. 3,031,329), a combination of hexamethylenetetramine and tin compound (U.S. Pat. No. 2,813,043), and the like.

On the other hand, examples of systems forming dye images are those in which the electron donating compound is an electron donating colorless dye, and the electron accepting compound is an acidic material such as phenol or the like (Japanese Pat. No. 4,160/68 and U.S. Pat. Nos. 3,451,338; 3,539,375; 3,674,535 and 3,666,525).

These binary coloration systems of heat-sensitive recording papers have many advantages as recording papers. For example: (1) they are based on primary coloration and do not require development processing; (2) the paper quality is similar to that of ordinary paper; and (3) they are handled with ease. In particular, those materials wherein a colorless dye is used as the electron donating compound have the additional advantages that (4) they provide higher color density and (5) they enable one to easily obtain heat-sensitive recording papers forming different colors, thus being more valuable. Therefore, they are in most use as heat-sensitive recording papers.

Above all, those papers in which a bisphenol derivative represented by the following general formula:

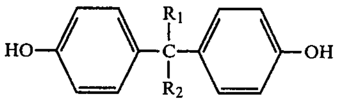

wherein $R_1$ and $R_2$ each represents a hydrogen atom or an alkyl group containing 1 to 12 carbon atoms (e.g., $R_1$ may be a hydrogen atom, a methyl group or an ethyl group while $R_2$ is a methyl, an ethyl, a propyl, an n-butyl, an n-octyl, an n-decyl, an iso-butyl, or an iso-heptyl group) or, when taken together, $R_1$ and $R_2$ form a saturated carbocyclic ring (i.e., cyclohexyl), is used as an electron accepting compound exhibit high coloration sensitivity and provide high coloration density. However, they have several defects. One defect is that they form increased background fog when stored under high temperature and high humidity conditions. Conventional binary coloration system of heat-sensitive recording papers from an increased background fog during storage under high humidity even when the temperature is lower than the temperature at which the coloration reaction takes place. This is not favorable in the point of storage stability. This tendency is particularly serious when paper is used as a support as compared with the case when a plastic film or metal is used as a support.

SUMMARY OF THE INVENTION

It is therefore an object of the present invention to provide a heat-sensitive recording paper showing an excellent storage stability under conditions of high temperature and high humidity.

As a result of investigating various means to attain this object, it has been discovered that a heat-sensitive recording paper exhibiting exceptionally good storage stability under the conditions of high temperature and high humidity can be obtained by controlling the hot water extraction pH of the base paper at about 6 to 9.

DETAILED DESCRIPTION OF THE INVENTION

The term "hot water extraction pH" as used herein means the pH of the extract obtained by extracting a sample piece of base paper with hot water as specified in JIS-P-8133-1976, (hereinafter abbreviated as extraction pH). 20 ml of the distilled water is added to about 1.0 g of sample pieces in a 100 ml erlenmeyer flask. The sample pieces are uniformly immersed in the distilled water using a stirring rod. 50 ml of distilled water is added to the obtained mixture and the mixture is stirred. The mixture is then placed in a flask equipped with a condenser and heated on a water bath maintained at 95° to 100° C. for one hour while occasionally shaking the flask without boiling the water. The solution is cooled to a temperature of 20° C.±5 deg. The pH of the extract obtained at the temperature of 20° C.±5° is the extraction pH.

Several recording papers prepared by providing a recording layer on a base paper with an extraction pH of around neutrality have been proposed (for example, Japanese Pat. No. 6,645/77). However, such recording papers have only been used for pressure sensitive recording papers and the electron accepting compounds used are different from those used in the present invention. Such papers have not been used in heat sensitive recording papers. In the case of the heat sensitive recording papers, the electron accepting compound and the electron donating colorless dye exist in the same layer, and under the condition of high temperature and high humidity they react with each other to cause coloration.

In the heat sensitive recording paper of the present invention the coating property of a coating solution is improved and the contamination of the hot pen and hot head used for recording with color forming components is prevented. When a smoothness and a water resistance are required, the wax such as paraffin wax, polyethylene wax, higher fatty acid (ethylenebisstearamide, stearic acid amide, etc.) and the like are added.

Generally, coating is carried out in a conventional manner (e.g., by air knife coating, blade coating, roller coating, bar coating, etc.). The amount of a coating solution is 2 to 10 g/m$^2$. The drying is carried out such that the temperature of the surface of the paper coated is lower than the temperature at which the coloration reaction takes place.

In order to depress the coloration reaction, attempts have been made (1) to keep the pH of the coating composition alkaline, or (2) to incorporate an alkaline material such as magnesium oxide in the color-forming layer. However, such attempts have not been successful and it has been found that a heat-sensitive recording paper exhibiting less fog when stored under high temperature and high humidity conditions is obtained using a base paper with an extraction pH in the range of from neutrality to weak alkalinity as a support.

This effect is particularly great when a composition capable of forming color at comparatively low temperatures (70°-100° C.) is used as the heat-sensitive color-forming layer.

As a process for producing a base paper used in the present invention, any sizing process that eventually provides an extraction pH of from neutrality to weak alkalinity can be employed. For this purpose, there are three types of sizing processes which are particularly suitable: (1) a process using a sizing agent which fixes itself onto the pulp fibers to exhibit its sizing effect; (2) a process using a non-acidic fixing agent or a sizing agent which provides an extraction pH around neutrality when used in combination with a fixing agent; and (3) a process of surface-treating with a sizing agent. These processes (1), (2), and (3) may be combined with each other.

As the typical sizing agents for use in process (1), there are cationic sizing agents including (I) sizing agents emulsified with a cationic surface active agent, e.g., quaternary amines, and (II) inorganic or organic salts of alkylamines such as (1) a higher fatty acid amine hydrochloride (the term "higher fatty acid" as used herein and below refers to a fatty acid having 8 or more carbon atoms such as stearic acid); (2) a higher fatty acid-alkanolamine condensate hydrochloride; (3) a higher fatty acid-polyalkylenepolyamine condensate hydrochloride; (4) a higher fatty acid amide hydrochloride; (5) a hydrochloride salt of the reaction product of a higher aliphatic amine and epichlorohydrin; (6) a fatty acid-acylated alkylenepolyamine/epichlorohydrin condensate; (7) a reaction product prepared by condensing ethylene oxide with a primary alkylamine, and further reacting the product with epichlorohydrin; (8) a product prepared using rosin, maleoylated rosin, maleoylated xylene resin, maleoylated petroleum resin, ester gum, or the like in place of higher fatty acid in (1)-(6) above; (III) salts of homopolymers or copolymers of nitrogen-containing vinyl monomers such as (1) methylstyrenevinylpyridine copolymer; (2) polycyclohexylaminoalkyl acrylate; (3) N-vinylimidazol/alkyl acrylate copolymer; etc.; (IV) reaction products of a chlorinated compound and an amine such as (1) a quaternary salt of vinylidene chloride/vinyl chloroacetate copolymer; (2) a reaction product of 1-chloromethyl-2,4-dimethylbenzene condensate and a trialkylamine, etc.; (3) a product prepared by chlorinating or chloromethylating methylstyrene or the like, and converting to cation using pyridine or the like.

There are also cationic sizing agents which are prepared by reacting a 1:1 condensate of methyl acrylate and polyethylenepolyamine with epichlorohydrine. These are described, for example, in U.S. Pat. No. 2,772,967, Japanese Pat. No. 6,204/53, U.S. Pat. Nos. 2,698,793, 2,479,480, 2,724,694, 2,964,445, 3,084,093, Belg. Pat. No. 625,363, Canadian Pat. No. 657,152, Japanese Patent Publication No. 13,682/65, British Pat. No. 864,336, etc.

Process (2) uses a sizing agent in combination with a cationic fixing agent. Suitable sizing agents are anionic sizing agents such as ordinary rosin sizing agent, petroleum sizing agent, etc., and reactive sizing agents such as alkylketene dimer, alkylsuccinic acid anhydride, etc. Cationic fixing agents to be used in combination with them are cationic high molecular electrolytes. Examples thereof include cation-converted starch, cation-converted urea-HCHO resin, dicyandiamide-HCHO resin, dicyandiamide-modified urea resin, cation-converted polyacrylamide, polyethyleneimine, epoxy-modified polyamide resin, etc. In addition, there are polyacrylic acid hydrazide prepared by converting sodium polyacrylate to hydrazide and cation-converted aliphatic acid amide.

Of the above-described sizing agents, reactive sizing agents such as alkylketene dimers and alkylsuccinic acid anhydrides, or fatty acid soaps containing 12 or more carbon atoms are effective in that they raise color density.

In process (3) any sizing agent for processes (1) and (2) can be used and process (3) is particularly preferred because no particular fixing agents are necessary.

The amounts of the sizing agent and the fixing agent added are properly selected based on the weight and thickness of the support, and the conditions for coating a color developer. Usually, the sizing agent is added in an amount of about 0.1-1.5 wt % as solids based on pulp, and the fixing agent in an amount of about 0.2-2.0 wt % as solids. However, the extraction pH of the support must be strictly controlled within the aforesaid range.

The electron donating colorless dyes, or color-forming agents generally used in the present invention are so-called leuco dyes, many of which are uses as colorless dyes for use in pressure-sensitive recording paper.

They react with an electron accepting compound, or color developer, to form color.

To be specific, there can be illustrated triarylmethane compounds, diphenylmethane compounds, xanthene compounds, thiazine compounds, spiropyran compounds, etc. Several examples thereof are illustrated below. As the triarylmethane compounds, there are 3,3-bis(p-dimethylaminophenyl)-6-dimethylaminophthalide (or crystal violet lactone), 3,3-bis(p-dimethylaminophenyl)phthalide, 3-(p-dimethylaminophenyl)-3-(1,2-dimethylindol-3-yl)phthalide, 3-(p-dimethylaminophenyl)-3-(2-methylindol-3-yl)phthalide, etc. As the diphenylmethane compounds, there are 4,4′-bis-dimethylaminobenzhydrin benzyl ehter, N-halophenyl-leucoauramine, N-2,4,5-trichlorophenylleucoauramine, etc. As the xanthene compounds, there are rhodamine-B-anilinolactam, rhodamine-B-(p-nitroanilino)lactam, rhodamine-B-(p-chloroanilino)lactam, 3-diethylamino-7-(dibenzylamino)fluoran, 3-diethylamino-7-phenylaminofluoran, 3-diethylamino-6-methyl-7-anilinofluoran, 3-diethylamino-7-(o-chloroanilino)-fluoran, 3-diethylamino-7-(3,4-dichloroanilino)fluoran, 3-piperidino-6-methyl-7-anilinofluoran, 3-diethylamino-7-phenylfluoran, etc. As the thiazine compounds, there are benzoyl leucomethylene blue, p-nitrobenzyl leucomethylene blue, etc. As the spiro compounds, there are 3-methyl-spiro-dinaphthopyran, 3-ethyl-spiro-dinaphthopyran, 3,3′-dichloro-spiro-dinaphthopyran, 3-benzyl-spiro-dinaphthopyran, 3-methyl -naphtho-(3-methoxybenzo)-spiropyran, 3-propyl-spiro-dibenzopyran, etc. These are used alone or in combination.

As the electron accepting compound, or the color developer, there are used phenol compounds, organic acids or the metal salts thereof, hydroxybenzoic acid esters, etc. In particular, phenolic compounds represented by the above formula and organic acids (e.g., aromatic carboxylic acids such as salicylic acid and its derivatives, for example, 3,5-di-tert-butylsalicylic acid, 3,5-di-(α-methylbenzyl)-salicylic acid and 3-octylsalicylic acid) or the metal salts (e.g., Al, Zn, Mg and Ca salts) thereof are desirable since they show a high color-developing ability and the resulting colored material is fact. Illustrative of the bisphenol compounds used in the present invention, there are 2,2-bis-(p-hydroxyphenyl)-propane, 2,2-bis-(p-hydroxyphenyl)-heptane, 2,2-bis-(p-hydroxyphenyl)octane, 1,1-bis-(p-hydroxyphenyl)-2-ethylhexane, 1,1-bis(4-hydroxyphenyl)cyclohexane, etc.

According to the most general process for preparing the heat-sensitive recording paper, the color formers and color developers are respectively dispersed in 1 to 10 wt % water-soluble polymer solutions using a ball mill, sand mill, or the like, then the resulting dispersions are mixed with each other and, if necessary, inorganic pigments, waxes, or the like are added thereto, followed by coating the mixture on a base paper.

The coating amount is generally about 2 to 10 g/m$^2$ (as solids). The lower limit is determined by the color density upon heat coloration, whereas the upper limit is determined mainly for economical reasons.

In general heat-sensitive recording papers are prepared by dispersing respectively the foregoing the color former and color developer in 1 to 10 wt % aqueous polymer solution by means of a ball mill, sand mill, or the like until an average particle size is 5 μm or less. Representative examples of the aqueous polymer solution are polyvinyl alcohol, hydroxyethyl cellulose, starch, stylenemaleic anhydride copolymer, carboxymethyl cellulose and the like. Specifically, polyvinyl alcohol and hydroxyethyl cellulose are preferable. The resulting dispersions are mixed with each other at a weight ratio of the color former to the color developer (1:20 to 1:2) and then the inorganic pigments such as a kaolin, aluminum hydroxide, talc, titanium oxide, zinc oxide, calcium carbonate and the like are added, if desired.

The present invention will now be described in more detail by the following non-limiting examples. Unless indicated herein, all parts, percents, ratios, etc in the following example are by weight.

EXAMPLE

Preparation of Samples 1-4

To 1,000 parts of pulp (LBKP.50°SR beating) dispersed in water at a concentration of 0.1 wt % was added 3 parts of a sizing solution prepared by emulsifying alkylsuccinic acid anhydride (Faibran-68 made by National Starch Co.) with cation starch (Cato-F made by National Starch Co.) in a proportion of 1:2 (by weight), and made into paper of 50 g/m$^2$ in basis weight to obtain a support (support A). The hot water extraction pH of this support was 7.

On thus obtained support A was coated with one of coating solutions a, b, a′, and b′ having the following formulations in an amount of 6 g/m$^2$ (as solids), and dried at 50° C. to obtain coated papers (Samples 1, 2, 3, and 4, respectively).

| Coating solution a | |
|---|---|
| Crystal Violet Lactone | 1 part by weight |
| Bisphenol A | 5 part by weight |
| Kaolin | 10 part by weight |
| Polyvinyl alcohol (PVA 110 made by Kurarey Co., Ltd.) | 5 part by weight |
| Water | 63 part by weight |

| Coating solution b | |
|---|---|
| 3-Diethylamino-6-methyl-7-anilinofluoran | 1 part by weight |
| Bisphenol A | 5 part by weight |
| Kaolin | 10 part by weight |
| PVA (PVA 110 made by Kurarey Co., Ltd.) | 5 part by weight |
| Water | 63 part by weight |

Coating Solution a′

This solution was prepared by adding 1 part by weight of a 20% stearic acid amide emulsion (Serozole A-671 made by Chukyo Yushi Co.) to coating solution a as a sensitivity-improving agent.

Coating Solution b′

This solution was prepared by adding 1 part by weight of a 20% stearic acid amide emulsion (Serozole A-671 made by Chukyo Yushi Co.) to coating solution b as a sensitivity-improving agent.

Preparation of Comparative Samples 1-4

To 1,000 parts of pulp dispersed at a concentration of 0.1 wt % in water was added 10 parts of reinforced rosin size SIZE PINE-P made by Arakawa Rinsan Co.), then 15 parts of aluminum sulfate (calculated as $Al_2(SO_4)_3.18\ H_2O$) was added thereto and made into paper of 50 g/$m^2$ in basis weight to obtain a support (support B). The hot water extraction pH of this support was 4.2.

On the thus obtained support B was coated, in the same manner as in Example 1, one of coating solutions a, b, a', and b' used for preparing above-described samples 1-4 to obtain coated papers (Samples C-1, C-2, C-3, and C-4, respectively).

Preparation of Comparative Samples 5 and 6

Coating solutions a' and b' (both being 6.5 in pH) were adjusted to a pH of 10.0 by adding a 1 N NaOH solution, and simultaneously coated, respectively, on support B to obtain coated papers (Samples C-5 and C-6, respectively).

Preparation of Comparative Samples 7 and 8

Coating solutions a" and b" were obtained in the same manner as with coating solutions a' and b' except using basic magnesium oxide in place of kaolin and respectively coated on support B to obtain coated papers (Samples C-7 and C-8, respectively).

The above-described samples were dried in an oven at 50° C. for 3 minutes and measured for initial fog density. Then, a stamp heated to 150° C. was applied to the samples for 1 second with a pressure of 500 g/$cm^2$ to determine color density. In addition, the stamp temperature was varied to determine the lower limit for forming color. This was taken as a color-forming temperature.

The color density was measured using a Macbeth reflection type densitometer, RD-504, through a visual filter.

Background fog upon storing under the conditions of high temperature and high humidity was measured in the same manner after storing the samples for 1 week at 50° C. under 80% RH.

The results thus obtained are set forth in Table 1.

From Table 1, it is seen that the present invention provides heat-sensitive recording papers forming less background fog under the conditions of high temperature and high humidity as compared with other papers.

TABLE 1

| Sample | Support | Heat Extraction pH | Coating Solution | Color forming Temperature (°C.) | Color Density | Initial Background Fog | Background Fog After Storing* | Color | Remarks |
|---|---|---|---|---|---|---|---|---|---|
| 1 | A | 7.0 | a | 90 | 1.45 | 0.07 | 0.06 | blue | Invention |
| 2 | | | b | 95 | 1.28 | 0.10 | 0.09 | black | " |
| 3 | | | a' | 70 | 1.26 | 0.08 | 0.08 | blue | " |
| 4 | | | b' | 70 | 1.12 | 0.11 | 0.10 | black | " |
| C-1 | B | 4.2 | a | 90 | 1.47 | 0.07 | 0.16 | blue | Comparison |
| C-2 | | | b | 95 | 1.25 | 0.11 | 0.15 | black | " |
| C-3 | | | a' | 70 | 1.24 | 0.10 | 0.23 | blue | " |
| C-4 | | | b' | 70 | 1.12 | 0.12 | 0.24 | black | " |
| C-5 | | | a' (pH = 10.0) | 70 | 1.26 | 0.11 | 0.18 | blue | " |
| C-6 | | | b' (pH = 10.0) | 70 | 1.08 | 0.13 | 0.20 | black | " |
| C-7 | | | a" | 70 | 1.22 | 0.10 | 0.17 | blue | " |
| C-8 | | | b" | 70 | 1.05 | 0.12 | 0.17 | black | " |

*1 week at 50° C. under 80% RH. Background fog density higher than 0.13 seriously deteriorates commercial values as the heat-sensitive recording paper.

While the invention has been described in detail and with reference to specific embodiments thereof, it will be apparent to one skilled in the art that various changes and modifications can be made therein without departing from the spirit and scope thereof.

What is claimed is:

1. A heat-sensitive recording paper comprising a base paper having a hot water extraction pH of about 6 to 9 having provided thereon a heat-sensitive recording layer containing an electron donating colorless dye and a phenol compound electron accepting acidic material, wherein said phenol compound is a bisphenol compound represented by the formula

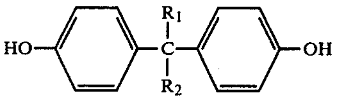

wherein $R_1$ and $R_2$ each represents a hydrogen atom or an alkyl group containing 1 to 12 carbon atoms or $R_1$ and $R_2$ combine to form a carbocyclic ring; or derivatives thereof.

2. The heat-sensitive recording paper of claim 1, wherein said electron donating colorless dye is a dye selected from the group consisting of a triarylmethane compound, a diphenylmethane compound, a xanthene compound, a thiazine compound, and a spiropyran compound.

3. The heat-sensitive recording paper of claim 1, wherein said base paper is a paper which has been sized using a sizing agent which produces an extraction pH of about 6 to 9.

4. The heat-sensitive recording paper of claim 3, wherein said sizing agent is a cationic sizing agent.

5. The heat-sensitive recording paper of claim 3, wherein said sizing agent is a combination of a cationic fixing agent and an anionic sizing agent.

6. The heat-sensitive recording paper of claim 3, wherein said sizing agent is an alkylketene dimer, an alkylsuccinic acid anhydride, or a fatty acid soap containing 12 to more carbon atoms.

7. The heat-sensitive recording paper of claim 1 which exhibits lower background fog during storage at high temperature and humidity prior to image-wise exposure to heat as a consequence of said base paper having said hot water extraction pH.

8. The heat-sensitive recording paper of claim 7 wherein said electron-donating colorless dye and said phenol compound are dispersed as fine particles in a binder which separates them from each other until heating, which heating melts one or more of the said compounds to bring them into contact with each other and result in a color forming reaction.

* * * * *